United States Patent
Kawabata et al.

[11] Patent Number: 5,803,664
[45] Date of Patent: Sep. 8, 1998

[54] PROCESS FOR REMEDIATING SOIL

[75] Inventors: Yuji Kawabata; Tetsuya Yano, both of Isehara; Yoshiyuki Touge, Sagamihara; Shinya Kozaki, Tokyo; Takeshi Imamura, Chigasaki; Masatoshi Iio, Funabashi; Michiyo Suzuki, Yotsukaido; Yuri Senshu, Kashiwa, all of Japan

[73] Assignees: Canon Kabushiki Kaisha; Raito Kogyo, Co, Ltd., both of Tokyo, Japan

[21] Appl. No.: 768,585

[22] Filed: Dec. 18, 1996

[30] Foreign Application Priority Data

Oct. 25, 1899 [JP] Japan ................................. 8-284212
Dec. 19, 1995 [JP] Japan ................................. 7-330428

[51] Int. Cl.$^6$ .................................................. B09B 1/10
[52] U.S. Cl. ........................ 405/128; 166/246; 210/611; 210/747; 435/262.5; 588/205
[58] Field of Search ............................ 166/246; 210/610, 210/611, 747; 405/128; 435/262.5; 588/205, 249

[56] References Cited

U.S. PATENT DOCUMENTS

| | | | |
|---|---|---|---|
| 3,846,290 | 11/1974 | Raymond | 166/246 X |
| 4,401,569 | 8/1983 | Jhaveri et al. | 166/246 X |
| 4,442,895 | 4/1984 | Lagus et al. | 166/308 X |
| 4,848,238 | 7/1989 | Boecker et al. | |
| 5,032,042 | 7/1991 | Schuring et al. | 405/258 |
| 5,111,883 | 5/1992 | Savery | 166/269 |
| 5,133,625 | 7/1992 | Albergo et al. | 405/263 |
| 5,150,988 | 9/1992 | Powell et al. | 405/258 |
| 5,302,286 | 4/1994 | Semprini et al. | 210/610 |
| 5,384,048 | 1/1995 | Hazen et al. | 210/747 X |
| 5,445,474 | 8/1995 | Lundegard et al. | 405/128 |
| 5,511,907 | 4/1996 | Tabasco | 166/246 X |
| 5,584,605 | 12/1996 | Beard et al. | 166/50 X |
| 5,658,093 | 8/1997 | Kawabata | 405/128 |
| 5,679,568 | 10/1997 | Imamura et al. | 435/262.5 |

FOREIGN PATENT DOCUMENTS

| | | |
|---|---|---|
| 0370409 | 5/1990 | European Pat. Off. |
| 0412472 | 2/1991 | European Pat. Off. |
| 3601979 | 7/1987 | Germany . |
| 1203194 | 1/1986 | U.S.S.R. . |

*Primary Examiner*—George A. Suchfield
*Attorney, Agent, or Firm*—Fitzpatrick, Cella, Harper & Scinto

[57] ABSTRACT

A process for remedying polluted soil which comprises the steps of injecting a liquid agent containing a microorganism into the polluted soil, and injecting a gas into a region wherein the water content of the soil became 0.6 or more times its saturation water content after the injection of the liquid agent. Using this method bioremediation of contaminated soil can be economically and efficiently carried out.

9 Claims, 9 Drawing Sheets

PROCESS FOR REMEDIATING SOIL

BACKGROUND OF THE INVENTION

1. Field of the Invention

The present invention relates to a process for remediating polluted soil.

2. Related Background Art

A large amount of chemical compounds or chemical products have been produced with the recent rapid progress in technology and science. Many of them do not originally exist in nature, thus they scarcely decompose of themselves or decomposed naturally, and are slowly accumulated in the environment and contaminate the nature. In particular, the land, where the human beings live, is most easily affected by artificial contamination, and since the environmental water is circulating among the land, hydrosphere, and atmosphere, the environmental pollution in the land is a serious problem which might be expanded to the global level. Well-known examples of soil (land) contaminants include organic compounds such as gasoline, organochloric compounds such as PCB, teratogenetic agrichemicals such as dioxin, and radioactive compounds. Particularly, fuel such as gasoline has been stored widely and in a large amount in a gas station's underground tank and the like, and the leakage of the fuel into soil due to the deterioration or damage of the tank has become a serious social problem. Organochloric compounds such as trichloroethylene and tetrachloroethylene were once extensively used for washing precision parts as well as for dry cleaning, and large scale contamination of soil and underground water due to the leakage of the organochloric compounds has been gradually revealed. Since such organochloric chemicals are teratogenic and carcinogenic to adversely affect the biosphere, purification of the polluted soil or ground water is now an issue to be solved immediately in addition to the isolation of the pollution source.

Methods to purify the soil contaminated by these contaminants include a method in which the contaminated soil is dug out and subjected to heat treatment, a method in which the contaminant is extracted from the contaminated soil by vacuum extraction, or a method using microorganisms which have such capabilities that decompose these contaminants. By the heat treatment method, the contaminants can be almost completely removed from the soil, however, it requires digging of the soil, thus the purification of the soil which is under buildings is hard to be carried out, and the cost required for digging and heat-treatment are huge thus it is difficult to apply this method to purify the contaminated soil in a large area. The vacuum extraction process is an inexpensive and simple purification process for volatile compounds, however, the removal efficiency for an organochloric compound of some ppm or less is low, and the purification thereof requires such a length of time that is measured in years. On the other hand, the purification method utilizing microorganisms do not require digging of the contaminated soil, thus the soil under buildings can be purified and by the use of microorganisms having high decomposing activities, the contaminants can be decomposed and eliminated in a short time, and it has been catching attention as an economical and efficient soil purification method.

U.S. Pat. No. 5,133,625 describes a method in which the injection pressure, flow rate and temperature are measured by using an extendable injection pipe to control the injection pressure, thereby the concentration of microorganisms and that of nutrients in the soil, to carry out purification of soils efficiently. U.S. Pat. Nos. 4,442,895 and 5,032,042 disclose a method of effective in situ microbial remediation of polluted soil, where cracks are formed in the soil using a liquid or a gas injected into the soil with pressure from an injection well. U.S. Pat. No. 5,111,883 discloses a method for injecting chemicals vertically or horizontally into a limited region of the soil by setting the relative position of the injection and extraction wells.

It has been considered that the injection of a pollutant-decomposing microorganism, nutrients, an inducer, oxygen, and other chemicals into the soil is essential for the microbial remediation of polluted soil. However, according to the conventional injection methods, an extremely large amount should be injected to remedy a wide area, since the liquid agent is injected from the injection element to fill the soil void. Such a process increases the processing period, labor and material costs, resulting in increased remediation expenses. Differing from chemicals, microorganisms can spontaneously grow and multiply when certain growth conditions such as nutrient are satisfied. If a liquid agent containing the microorganism and nutrient can be injected in an amount as small as possible into a wide area of soil and the microorganism can grow in the soil to decompose pollutants, the purification expenses is considerably decreased. However, when the necessary amount of the microorganism and nutrient is injected into a wide area after dilution, the processing period and labor required for injection do not decrease. Further, such a method that the liquid agent will fill most of the soil void may cause soil fluidization and soften the ground with a high possibility, it cannot be applied to the soil under heavy structures. Moreover, the liquid agent injected into the soil penetrates into the deeper layers and diffuses into underground streams. Therefore, mobile microorganisms and nutrients will not remain within the desired area and lost. Thus, reinjection is required, making it difficult to remedy soil at a low cost. Further, the runoff of the microorganism and nutrient may cause secondary environmental pollution. Consequently, in microbial soil purification, it is required a method for injecting using a small amount of the agent into a wide area of soil without filling all the void (pore space) of the soil.

SUMMARY OF THE INVENTION

The present invention has been made in view of the above-mentioned problems of the conventional techniques, and its objective is to provide a soil remediation method in which a treating liquid agent is distributed over a wide area by injecting a reduced quantity of the liquid agent into the soil.

According to the present invention, there is provided a process for remedying a soil contaminated with a pollutant by using a microorganism, comprising the steps of:

injecting a liquid containing a microorganism capable of degrading the pollutant into a predetermined site of the soil region to be remedied; and injecting gas into the predetermined site where the liquid agent is injected, wherein the gas injection step is conducted when a water content of the site is 0.6 or more times a saturation water content of the soil.

The present invention is based on the finding that a small amount of a liquid agent containing a microorganism and nutrients can be distributed in a large area of the soil by injecting the agent from an injection element into the soil, followed by injection of a gas when the water content of the soil becomes 0.6 or more times as much as its saturation water content due to the injection of the liquid agent. It is also based on a finding that the injection treatment can be carried out more effectively by repeatedly injecting a liquid agent and a gas in turn where the gas is injected when the water content becomes 0.6 or more times as much as its saturation water content after the liquid injection.

In soil hardening technology which has no relation with the microbial soil remediation, a treatment process has been known in which a gas and a liquid agent for soil hardening are injected into soil alternately. For example, SU No.1203194A describes a process in which voids are produced in the soil around an injection port by injecting a pressurized gas, and a chemical solution is infiltrated into the soil by the gas pressure so that the soil is press-hardened. Also, the jet grout technique is a known technique for improving the soil ground by injecting very high pressure water, compressed air and a hardening agent into the soil, in which the soil is fractured by the high pressure-energy of water and air, and a part of the soil is evacuated to the ground surface, while a hardening agent is mixed into the soil for soil hardening. However, these known techniques disclose nothing about the technical concept of the present invention, that is, the injected liquid is carried by the gas.

DETAILED DESCRIPTION OF THE PREFERRED EMBODIMENTS

When a liquid agent containing microorganisms and nutrients and the like is injected under pressure into soil, the area wherein the solution can be injected is mostly decided by the water permeation coefficient of the soil and the amount of the solution injected. For example, in the case of sand layer having a large water permeation coefficient, the injected liquid agent spreads almost spherically from the injection point filling the voids of the soil, finally in a form of sphere the size of which is decided by the amount of the injected solution and the porosity of the soil, while a part of the solution falls down spontaneously due to its own weight. In the case of loam layer having a smaller water permeation coefficient, the injected liquid agent spreads in a vein-like form along the weaker soil structure. In both cases, the injected liquid agent fills the voids in the soil and migrates, thus a large amount of the liquid agent is required, if the liquid agent is injected and distributed in the soil of a large area. In order to carry out the soil remediation economically and efficiently, it is preferable to inject and distribute a liquid agent of minimal amount in an extensive area of the soil, therefore it is preferable to migrate the injected liquid agent in the soil without diluting the solution.

Such migration of the liquid agent can be attained by injecting a gas into a region of the soil where the water content of the soil is maintained at a certain level due to the injected liquid agent, illustratively the water content of 0.6 or more times and not more than 1.0 times its saturation water content. The materials to be contained in the liquid agent include, for example, a microorganism which can decompose a chemical substance, a growth agent used for microbial growth, an activity-supporting agent required for decomposition activity expression, a survival agent required for stable microbial inhabitation, an infiltration agent for easy infiltration of the above materials, a channel forming agent for enhancing infiltration of the liquid agent into the soil, and an indicator for monitoring the infiltration of the liquid agent into the soil. These materials may be used alone or in combination in the liquid agent to be injected.

Examples of microorganisms which can decompose chemical pollutants include those of genera Saccharomyces, Hansenula, Candida, Micrococcus, Staphylococcus, Streptococcus, Leuconostoc, Lactobacillus, Corynebacterium, Arthrobacter, Bacillus, Clostridium, Neisseria, Escherichia, Enterobacter, Serratia, Achromobacter, Alcaligenes, Flavobacterium, Acetobacter, Nitrosomonas, Nitrobacter, Thiobacillus, Gluconobacter, Pseudomonas, Xanthomonas, and Vibrio.

The growth agent means a nutrient for the microorganism, using which the microorganism grows to decompose the chemical substance in soil. As a useful growth agent, there are bouillon, M9, Malt Extract, MY, or a selective medium for nitrifying bacteria. When the degrading enzyme is constitutively expressed in the microorganism, the activity-supporting agent is not necessary. When the expression of the enzyme requires a specific inducer, such an inducer must be added as the activity-supporting agent. Examples of inducers include methane for methane-oxidizing bacteria; toluene, phenol and cresol for aromatic-assimilating bacteria; ammonium salts for nitrifying bacteria. Decomposing enzymes can also be directly used for remedying polluted soil. In such a case, an energy source or minerals required for the enzyme activity must be added as the activity-supporting agent.

The survival agent provides a habitat for the useful microorganism, preventing predation by other microorganisms and small animals, or diffusion into ground water. Any microorganism-carriers used for bioreactors in medical or food industries and waste water treatment can be used as a survival agent. Examples of survival agent include particulate carriers, e.g. porous glass, ceramics, metal oxides, activated charcoal, kaolinite, bentonite, zeolite, silica gel, alumina and anthracite; gel carriers, e.g. starch, agar, chitin, chitosan, polyvinyl alcohol, alginic acid, polyacrylamide, carrageenan, agarose, and gelatin; polymer resins and ion exchange resins, e.g. cellulose, glutaraldehyde, polyacrylic acid and urethane polymers. Further, natural and synthetic polymer compounds, e.g. cellulose products such as cotton and hemp, pulp paper, polymeric acetate which is a modified natural product, and polyester and polyurethane cloths can be also used in the present invention. Compost is a useful material which acts as both a growth agent and a survival agent. Examples of compost materials include straw, sawdust, rice bran, bagasse, and crab and lobster shells.

Examples of channel forming agents include surfactants, e.g. sodium dodecyl sulfate and TRITON-X, an ethoxylated alkylphenol sold by Rohm & Haas; and foaming agents, e.g. sodium hydrogen carbonate and ammonium carbonate. It is preferred that the indicator readily dissolves or disperses in the liquid agent and readily detected at the migration point when it migrates with the liquid agent. Examples of indicators include water-soluble pigments which changes the color of the soil, and organic acids and salts for changing the electroconductivity of the soil.

Examples of a gas to be injected include air, oxygen, carbon dioxide, nitrogen, hydrogen, helium, neon, argon, carbon monoxide, methane, nitrogen monoxide, nitrogen dioxide, and sulphur dioxide. By injecting such a gas into a part of the soil where a liquid agent containing a microorganism and nutrient has been injected and the soil becomes to have the water content of 0.6 or more times its saturation water content, the liquid agent remaining in the voids of the soil is pushed out and migrated further away from the injecting element. For example, when 1 liter of a liquid agent is injected into a fine sand layer of which water content is around 0.5 times its saturation water content, the water content of the soil in a sphere of 8 cm radius from the liquid agent injection port, becomes 0.8–1 times its saturation water content. If no gas is injected, the liquid agent migrates downwards with time by its own weight, and in about 2 to 3 hours, the water content of the soil in the sphere becomes less than 0.6 times its saturation water content. Therefore, according to the present invention, the injection of a gas is preferably carried out immediately after the injection of the liquid agent, illustratively at latest within 3 hours, more specifically within 2 hours, though it depends on the soil condition. When the region in the soil into which the liquid agent is to be injected or diffused has already a high water content prior to the injection, the injected liquid agent will be diluted. Thus, the water content of the soil where the liquid agent is to be injected is preferably 0.5 or less times, preferably 0.45 or less times its saturation water content. When a liquid agent is injected into and diffused through a region of the soil of a high water content, the water content of the soil is preferably lowered by, for example, injecting a gas prior to the injection of the liquid agent. This preliminary gas injection also secures the voids in the soil for injection of the liquid agent. By repeating a process of injecting a liquid agent and a gas in this order, where the latter is carried out while the water content of the soil is higher than the predetermined level, the liquid agent can be distributed in a soil region where originally the infiltration of the liquid agent is not easy, so that the microorganism and nutrient contained in the liquid agent can be more uniformly distributed in the end. Furthermore, by sequentially changing the concentration of the liquid agent component or that of the gas component during the injection process, the concentration of the components can be varied in the soil. Also, in this injection process, by changing the components of the liquid agent or the gas, the injected components can be distributed in the soil in a localized fashion. By using such an injection method, the concentration distribution of the injected components in the soil can be changed and the decomposition activity of the microorganism can be controlled from outside.

According to the method of injecting a liquid agent into soil followed by a gas injection carried out while the water content of the soil is higher than the predetermined level, the injected solution is migrated and distributed in the extensive soil region without filling almost all the voids in the soil, in other words, soil voids filled with gas are remained. That means, the injection treatment can be carried out without increasing the water content of the soil to its saturation water content, thus the natural dropping of the liquid agent by its own weight does not occur easily and the outflow of the components such as the microbial nutrient is small and so the secondary contamination caused therefrom. When a gas containing a component necessary for the growth and proliferation of the microorganism such as oxygen or methane is used for injection, gas supply for the microorganisms can be simultaneously carried out in addition to the injection and distribution of the microorganisms and the nutrient.

Figures 1A, 1B:
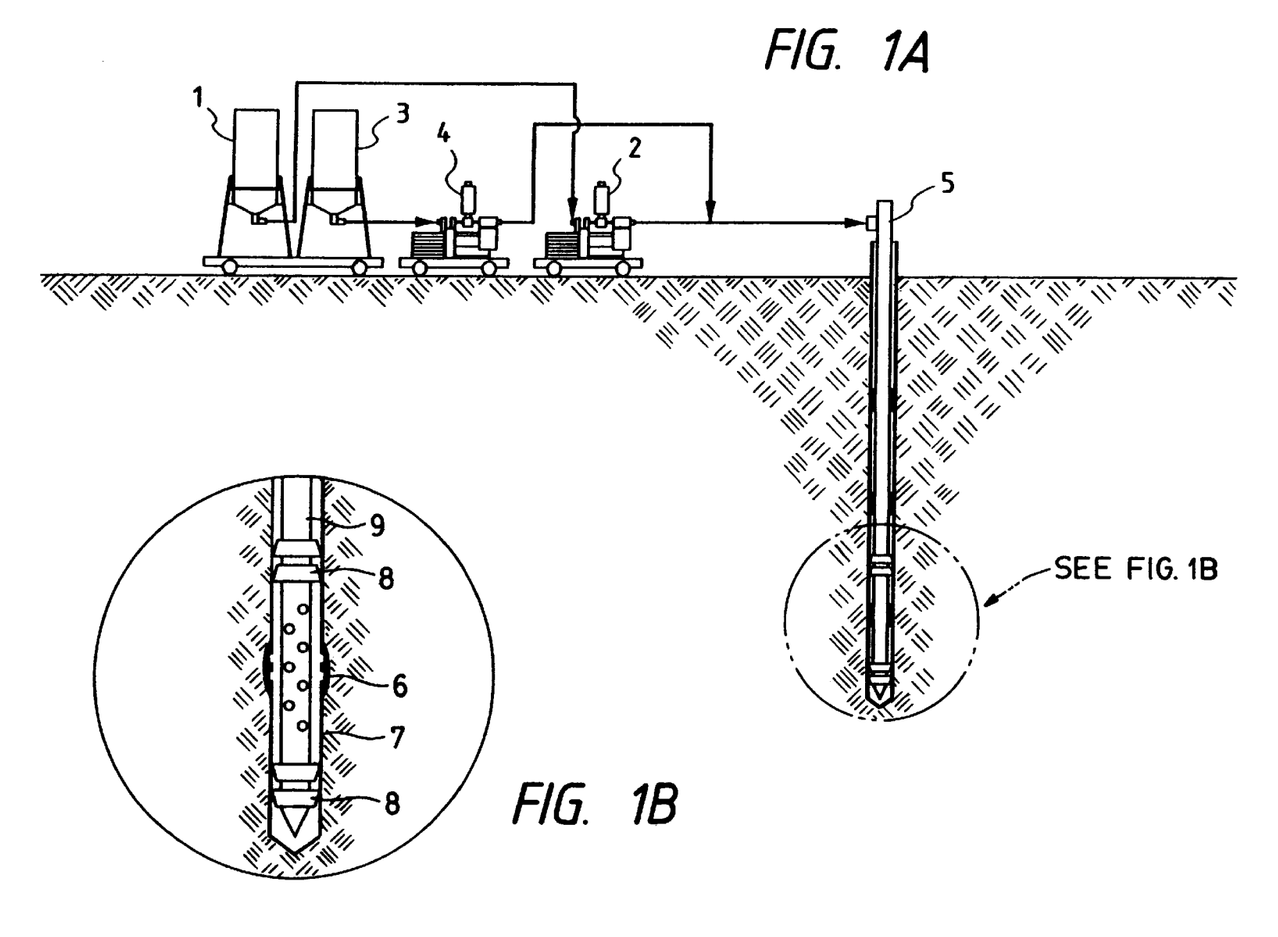
FIG. 1A is a schematic illustration of one example of an apparatus used for injecting a liquid agent in the present invention and FIG. 1B is an enlarged view of an end of an injection pipe of the apparatus.

One example of the liquid agent injection apparatus according to the present invention is shown in FIG. 1A. The injection apparatus comprises a liquid agent tank 1 to store the liquid agent, a liquid agent pressure pump 2, a gas tank 3 to store the gas to be injected, a pressure pump 4 by which the gas is sent under pressure into the soil, and an injection pipe 5. In order to drive the injected liquid agent further into the soil, The liquid agent is injected into the soil by running the pump 2 for a predetermined length of time, and then under the conditions that the water content of the soil has become 0.6 or more times its saturation water content due to the injection of the liquid agent, the pump 4 is operated for a predetermined length of time so that the gas is injected to drive the liquid agent away. At this time, the amount of the liquid agent to be injected and the amount of the gas to be injected are controlled by the operation time of pump 2 and that of pump 4 according to the area of the soil region to be treated, the concentration of the contaminants, the microbial capacity of decomposing the contaminant and the like. When the liquid agent injection process and the gas injection process are carried out repeatedly, each pump are operated repeatedly. When the concentration or the components of the liquid agent or the gas is changed, it is carried out in tank 1 and tank 3. By using a pump suitable for introducing both gas and liquid, the liquid agent and the gas can be injected into the soil by one pump. As an injection pipe 5, a single pipe having an injection opening at the tip or on the side can be utilized. When an injection operation is carried out repeatedly changing the injection depth, it is useful to combine a Manchette pipe 7 having a rubber sleeve 6 with a sleeve pipe 9 having packers 8 as shown in FIG. 1B. That means, the sleeve pipe 9 is moved up and down and set at a desired position, then the upper and lower packers 8 are expanded, and the liquid agent is sent under pressure through the sleeve pipe 9 to the part between the upper and lower packers 8, and infiltrated into the soil under pressure through the rubber sleeve 6. Then the air is injected through the sleeve pipe 9 to drive the liquid agent further in the soil. This process can be repeatedly carried out at different injection depths.

As explained above, a small amount of the liquid agent can be distributed in the soil of a large area according to each embodiment of the present invention, and microbial purification of the soil can be carried out economically and efficiently.

The present invention will be further illustrated with the following examples but those examples are not to be construed to limit the present invention.

EXAMPLES

Example 1

Migration of Microbial Cells and Change of Water Content in Column with Injection of Liquid Agent Followed by Immediate Air Injection In a column of 5.0 cm in inner diameter and 100 cm long, a 5 cm-deep gravel layer was provided at the bottom of the column and 2900 g of fine sand was packed thereupon. The saturation water content of the fine sand was 23% and the water content at the time was 10%. On the packed fine sand, another gravel layer of 5 cm deep was provided and the column was used in experiments. The depth of the packed fine sand layer was 90 cm. As a microorganism, strain JI (National Institute of Bioscience and Human-Technology, Agency of Industrial Science and Technology: FERM BP-5102) was used. It was cultured overnight in an M9 medium supplemented with 0.1% yeast extract. The number of the microorganism of the overnight culture, determined by the number of colonies formed on an agar medium, was $5 \times 10^8$ cells/ml. The overnight culture was diluted 500 times with pure water, and the dilution of $1 \times 10^6$ cells/ml was injected into the column as a liquid agent from the bottom. The injection of the liquid agent was carried out using a peristaltic pump at the pumping speed for injection of 50 ml/min. The injection of the liquid agent was stopped when the liquid agent reached 45 cm from the bottom of the sand layer, immediately followed by injection of air under a pressure of 1 kg/cm$^2$. Air injection was continued until the water front in the sand was observed to reach the upper end of the sand layer. The water content of the soil in the lower 50 cm of the column immediately after the injection of the liquid agent was about 22–23%, which was determined using another similar column. The water content was determined by weighing samples before and after drying at 120° C. overnight.

Figure 2:
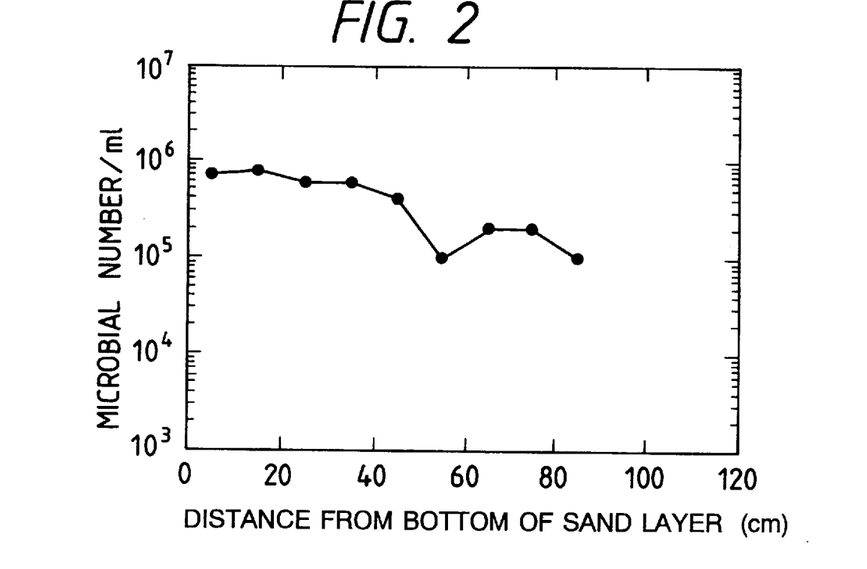
FIG. 2 is a graph showing the number of microorganism at the sampling points in Example 1.
Figure 3:
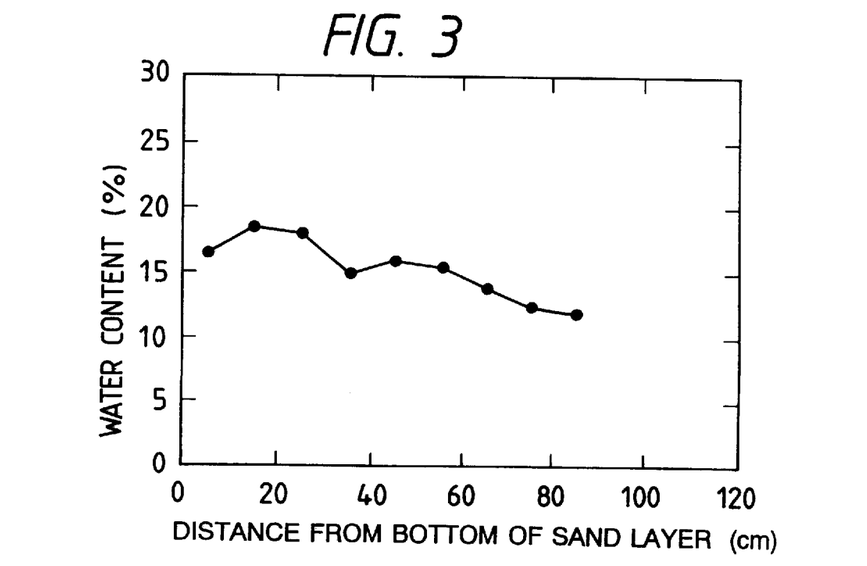
FIG. 3 is a graph showing the water content at the sampling points in Example 1.

Immediately after the air injection, the fine sand layer was taken out of the column and the migration of the microorganism and the change of the water content were determined. The sampling of the sand layer was carried out at a total of 9 points, ranging from 5 cm from the bottom of the sand layer, to 85 cm from the bottom of the sand layer, with an interval of 10 cm. The number of the microorganism at each sampling point was determined as follows: 20 ml of pure water was added to 20 g of the sample, and vortexed for 30 seconds, followed by appropriate dilution. The dilution was plated on an agar medium to count the number of the colonies formed. The water content was determined as follows: each sample was weighed and dried at 120° C. overnight and from the weight before and after drying the water content was calculated. The number of the microorganism at each sampling point is shown in FIG. 2 and the water content is shown in FIG. 3. These results show that the microorganism and water were migrated efficiently in the soil by sending air under pressure through an area where the water content is 0.6 or more times its saturation water content. The results also show that the localized increase of the water content in the column can be controlled so that the water content can be leveled in the entire column.

Example 2

Migration of Microbial Cells and Change of Water Content in Column with Repeated Injection of Liquid Agent Followed by Immediate Air Injection In a column of 5.0 cm in inner diameter and 130 cm long, a 5 cm-deep gravel layer was provided at the bottom of the column and 3867 g of fine sand was packed thereupon. The saturation water content of the fine sand was 23% and the water content at the time was 10%. On the packed fine sand, another gravel layer of 5 cm deep was provided and the column was used in experiments. The depth of the packed fine sand layer was 120 cm. As a microorganism, strain JI (FERM BP-5102) was used. It was cultured overnight in an M9 medium supplemented with 0.1% yeast extract. The number of the microorganism of the overnight culture, determined by the number of colonies formed on an agar medium, was $5 \times 10^8$ cells/ml. The overnight culture was diluted 500 times with pure water, and the dilution of $1 \times 10^6$ cells/ml was injected into the column as a liquid agent from the bottom. The injection of the liquid agent was carried out using a peristaltic pump at the pumping speed for injection of 50 ml/min. The injection of the liquid agent was stopped when the liquid agent reached 30 cm from the bottom of the sand layer, and immediately followed by injection of the air under a pressure of 1 kg/cm$^2$. Air injection was continued until the water front in the sand was observed to reach 60 cm from the bottom of the sand layer. Then the liquid agent was injected again at the same pumping speed as in the first injection, and the injection was stopped when the liquid agent reached 60 cm from the bottom of the sand layer, then air was injected under the pressure of 1 kg/cm$^2$ again, so that the water front in the fine sand was observed to be pushed up to 90 cm from the bottom of the sand layer. The third injection of the liquid agent and air under pressure was repeated in the same manner as in the previous injection and the water front in the fine sand was pushed up to 120 cm from the bottom of the sand layer. The water content before each air injection step was measured using three separately prepared sand packed columns, and they were all 22–23%.

Figure 4:
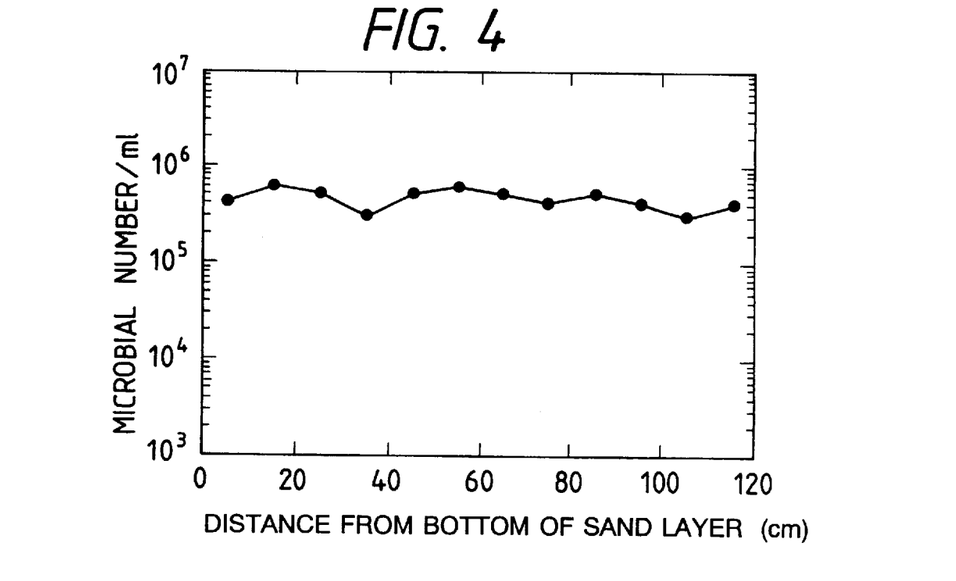
FIG. 4 is a graph showing the number of microorganism at the sampling points in Example 2.
Figure 5:
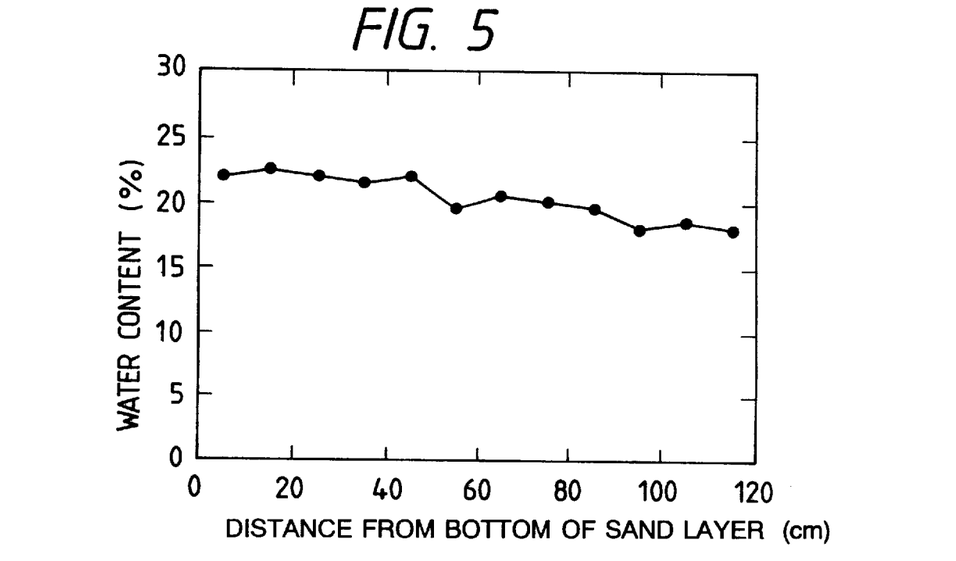
FIG. 5 is a graph showing the water content at the sampling points in Example 2.

After the injection of air, the fine sand layer was taken out from the column and the migration of the microorganism and change of the water content were determined. Sampling of the sand layer was carried out at a total of 12 points, starting from a point of 5 cm from the bottom of the sand layer to a point of 115 cm from the bottom of the sand layer, with an interval of 10 cm. The number of the microorganism at each sampling point was obtained as follows: 20 ml of pure water was added to 20 g of the sample, and vortexed for 30 seconds, followed by appropriate dilution. The dilution was plated on an agar medium to count the number of the colonies formed. The water content was determined as follows: each sample was weighed and dried at 120° C. overnight and from the weight before and after drying the water content was calculated. The number of the microorganism at each sampling point is shown in FIG. 4 and the water content is shown in FIG. 5. These results show that the microorganism and water were migrated efficiently in the soil by sending air under pressure through an area where the water content is 0.6 or more times its saturation water content. The results also show that the localized increase of the water content in the column can be controlled so that the water content can be leveled in the entire column.

Comparative Example 1

Migration of Microbial Cells and Change of Water Content in Column with Injection of Liquid Agent Alone A procedure was carried out in the same manner as in Example 1 except that the injection of the liquid agent was continued until the water front in the sand was observed to reach the upper end of the column, and except that air injection was omitted. Then the migration of microorganism and water content in the fine sand in the column was observed in the same manner as in Example 1.

Figure 6:
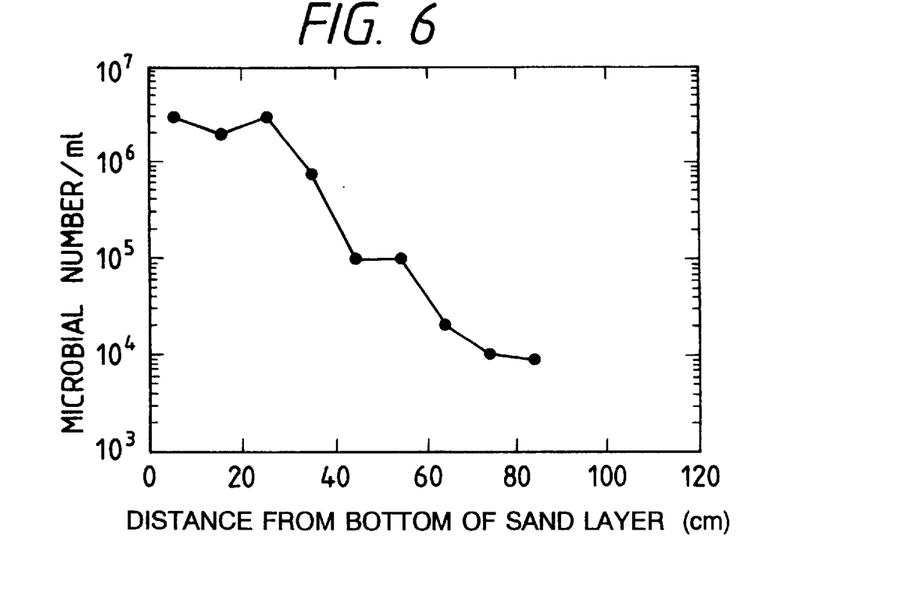
FIG. 6 is a graph showing the number of microorganism at the sampling points in Comparative Example 1.
Figure 7:
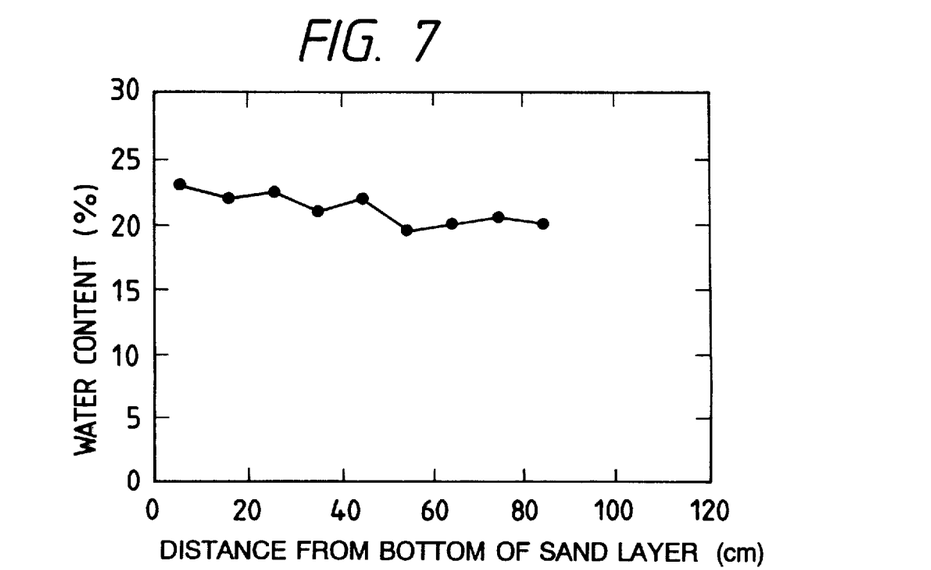
FIG. 7 is a graph showing the water content at the sampling points in Comparative Example 1.

The number of the microorganism and the water content at each sampling point are shown in FIG. 6 and FIG. 7 respectively. These results show that the injection of the liquid agent alone only increases the water content of the soil and does not allow the microorganism to migrate efficiently.

Comparative Example 2

Figure 8:
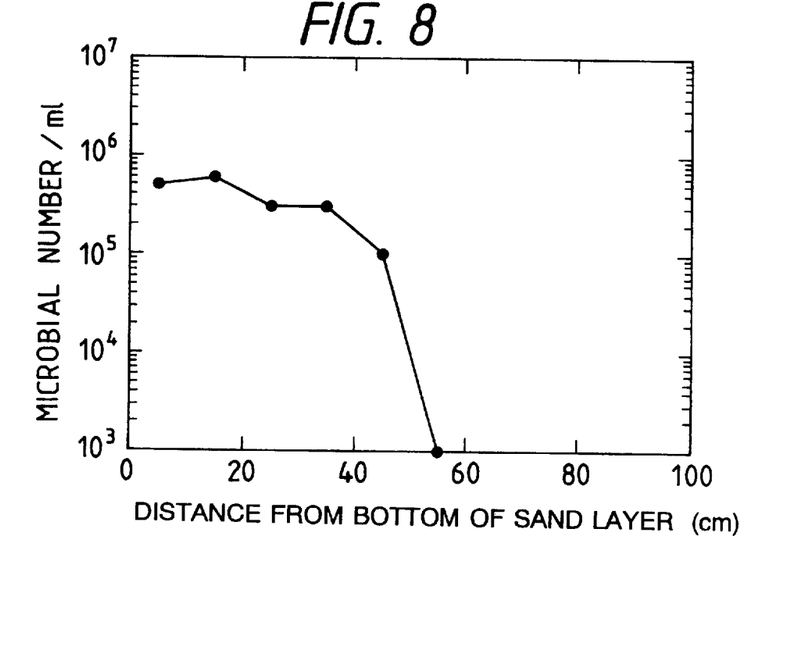
FIG. 8 is a graph showing the number of microorganism at the sampling points in Comparative Example 2.
Figure 9:
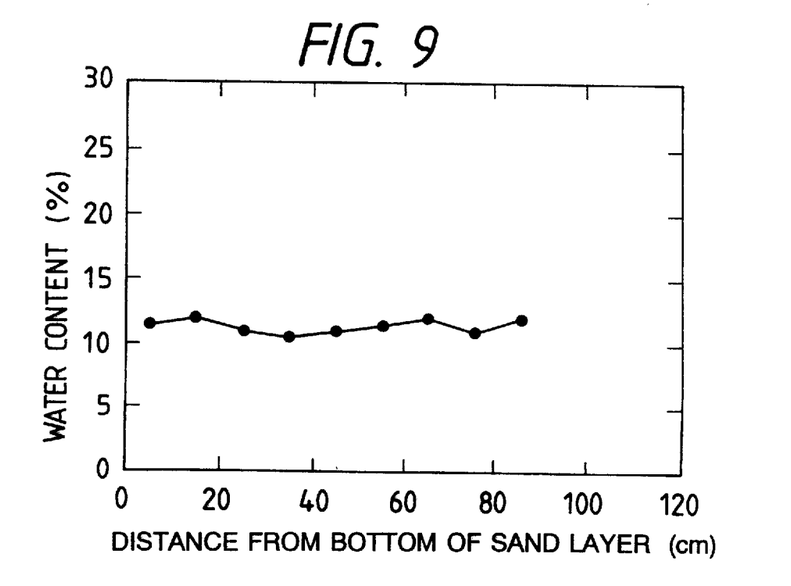
FIG. 9 is a graph showing the water content at the sampling points in Comparative Example 2.

A process similar to that of Example 1 was carried out except that the air injection was carried out 24 hours after the injection of the liquid agent, to observe the migration of microorganism and change of water content in the column. At that moment, almost all the water in the column had been evacuated from the column, and the water content at the bottom of the fine sand layer was about 0.5 times its saturation water content. The migration of the microorganism in the fine sand layer and the change of the water content after the injection of air are shown in FIG. 8 and FIG. 9 respectively.

Example 3

Migration of Microbial Cells and Change of Water Content in Pot with Injection of Liquid Agent Followed by Immediate Air Injection In a stainless pot having an inner diameter of 32 cm, a length of 30 cm, a gravel layer of 5 cm deep and 30 kg of fine sand were placed in this order to be used for experiments, where the saturation water content and the water content of the fine sand was 23% and 10% respectively, and the height of the sand layer was 25 cm. As a microorganism, strain JI (FERM BP-5102) was used. It was cultured overnight in an M9 medium supplemented with 0.1% yeast extract. The number of the microorganism of the overnight culture, determined by the number of colonies formed on an agar medium, was $5\times10^8$ cells/ml. The overnight culture was diluted 500 times with pure water, and the dilution of $1\times10^6$ cells/ml was injected into the pot as a liquid agent. The injection of the liquid agent was carried out using a peristaltic pump in the center of the pot, at the depth of 8 cm, and the pumping speed for injection was 200 ml/min. The liquid agent was injected for 5 minutes, then without delay, about 40 l air was injected under a pressure of 1 kg/cm² for 3 minutes through the same injection port. The water content of the soil before the air injection was measured at 6 points within a sphere of a radius of 8 cm from the injection port, using a separately prepared sand packed pot, and they were about 22–23%.

Immediately after the air injection, the fine sand layer was taken out from the pot to determine the migration of the microorganism and the change of water content. Sampling of the sand layer was carried out at a total of 12 points, i.e. at radii of 6 cm, 9 cm and 12 cm from the center of the pot, each in the depth of 2 cm, 8 cm, 14 cm and 20 cm from the surface of the soil. The number of the microorganism at each sampling point was obtained as follows: 20 ml of pure water was added to 20 g of the sample, and vortexed for 30 seconds, followed by appropriate dilution. The dilution was plated on an agar medium to count the number of the colonies formed. The water content was determined as follows: each sample was weighed and dried at 120° C. overnight and from the weight before and after drying the water content was calculated.

Figure 10:
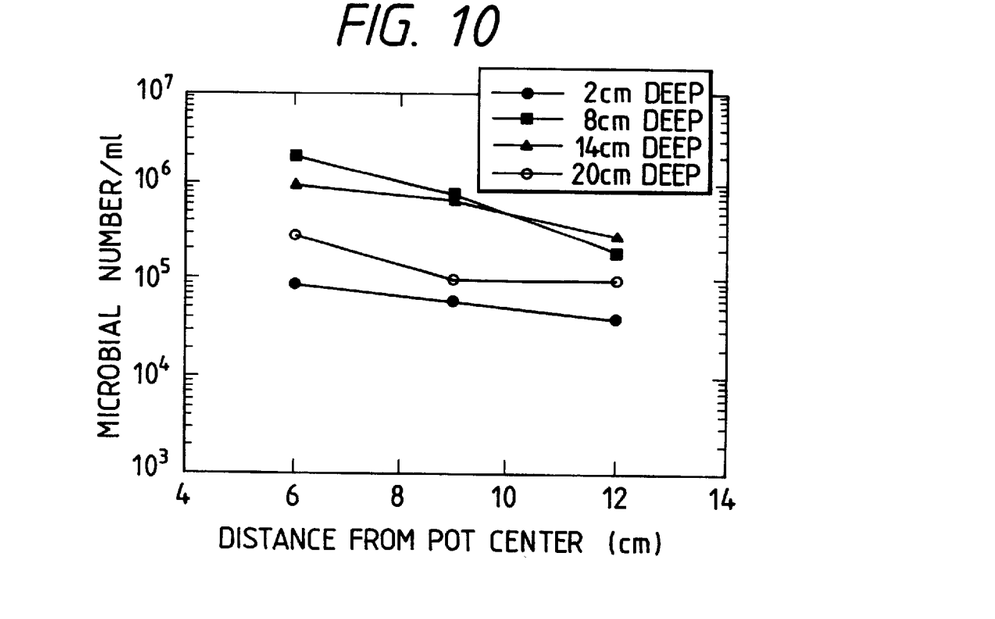
FIG. 10 is a graph showing the number of microorganism at the sampling points in Example 3.
Figure 11:
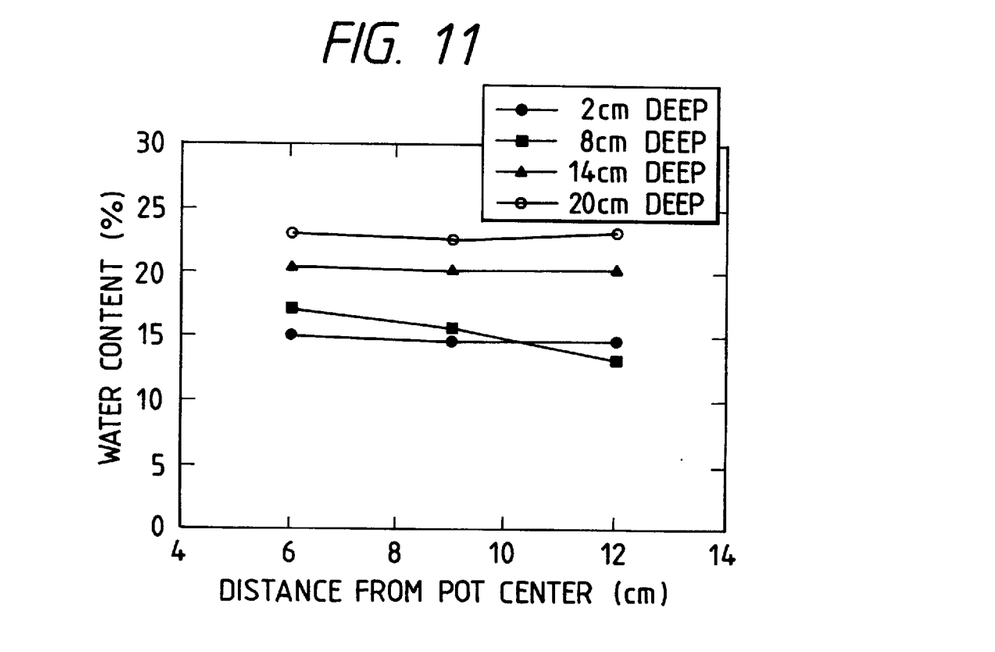
FIG. 11 is a graph showing the water content at the sampling points in Example 3.

The number of the microorganism at each sampling point is shown in FIG. 10 and the water content is shown in FIG. 11. These results show that the microorganism and water were migrated efficiently in the soil by sending air under pressure through an area where the water content is 0.6 or more times its saturation water content. The results also show that the localized increase of the water content in the radius directions of the same depth in the pot can be controlled so that the water content can be leveled at the same depth.

Example 4

Migration of Microbial Cells and Change of Water Content in Pot with Repeated Injection of Liquid Agent Followed by Immediate Air Injection A pot packed with fine sand and a liquid agent were prepared in the same manner as that used in Example 3. The injection of the liquid agent was carried out using a peristaltic pump at the center of the pot at a depth of 8 cm, and the pumping speed for injection was 200 ml/min. The liquid agent was injected for 3 minutes, then about 40 l air was injected under a pressure of 1 kg/cm² for 3 minutes without delay from the same injection port. Immediately after the injection of the air, the liquid agent and then air were injected again in the same manner as in the first injection. The process was repeated two more times. The water content immediately after each injection of the liquid was measured by using separately prepared sand packed pots were 22–23%.

Figure 12:
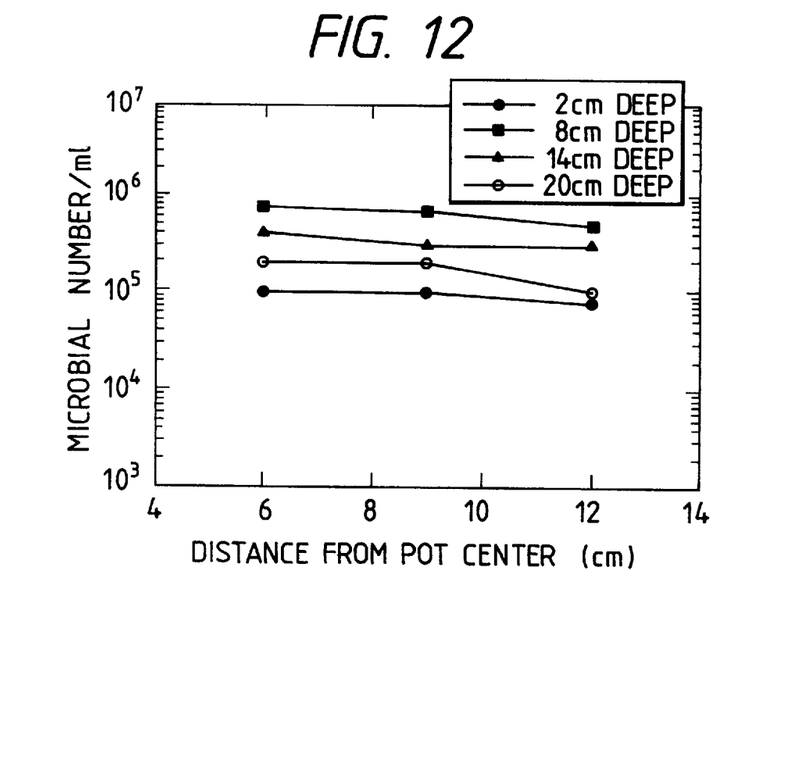
FIG. 12 is a graph showing the number of microorganism at the sampling points in Example 4.
Figure 13:
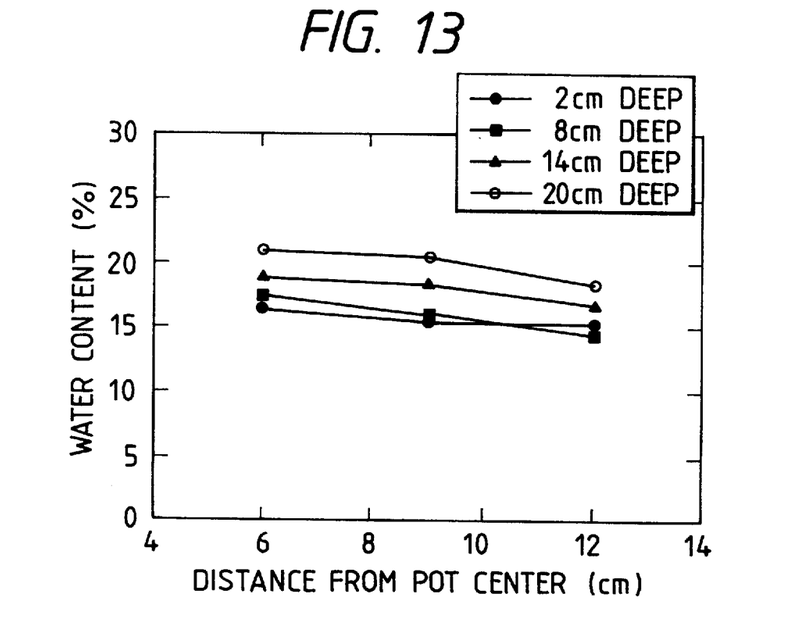
FIG. 13 is a graph showing the water content at the sampling points in Example 4.

The migration of the microorganisms and the change of water content in the fine sand layer after injection of air were obtained in the same manner as in Example 3. The number of the microorganism and water content at each sampling point are shown in FIG. 12 and FIG. 13 respectively. These results show that the microorganism and water were migrated efficiently in the soil by repeating the liquid injection each followed by the air injection under pressure through an area where the water content is 0.6 or more times its saturation water content. The results also show that the localized increase of the water content in the pot at the same depth can be controlled so that the water content in the radius direction can be leveled.

Comparative Example 3

A process similar to that of Example 3 was carried out except that the air injection into the soil was carried out 24 hours after the liquid injection, to observe the migration of microorganism and the change of water content in the pot. The water content measured before the air injection at 6 points in a sphere of 8 cm radius from the injection port were around 0.5 times its saturation water content at maximum.

Figure 14:
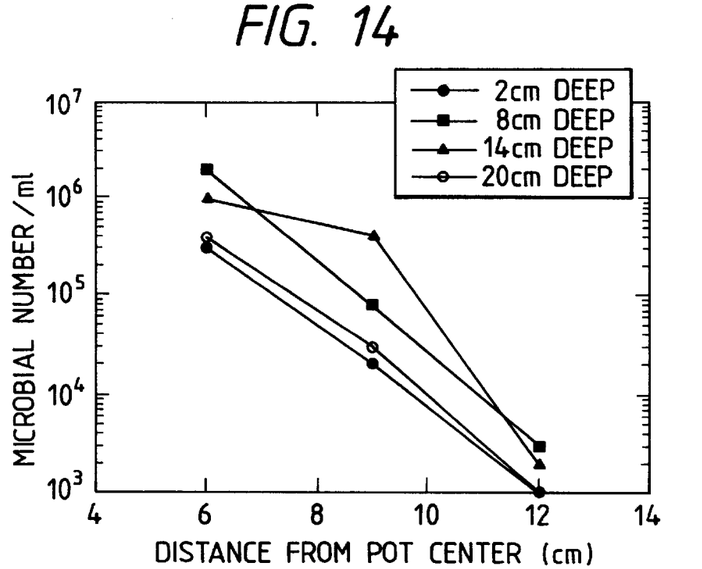
FIG. 14 is a graph showing the number of microorganism at the sampling points in Comparative Example 3.
Figure 15:
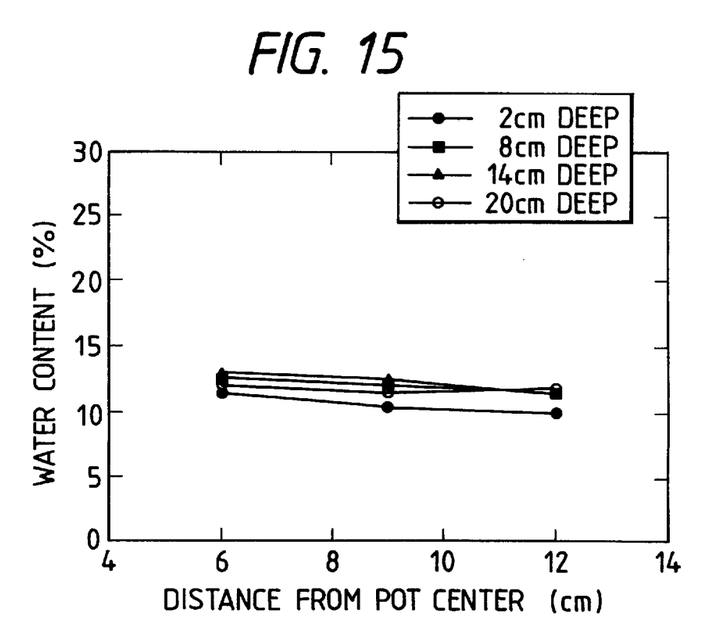
FIG. 15 is a graph showing the water content at the sampling points in Comparative Example 3.

The migration of the microorganism in the fine sand layer and the change of the water content after the air injection are shown in FIG. 14 and FIG. 15 respectively.

Comparative Example 4

Figure 16:
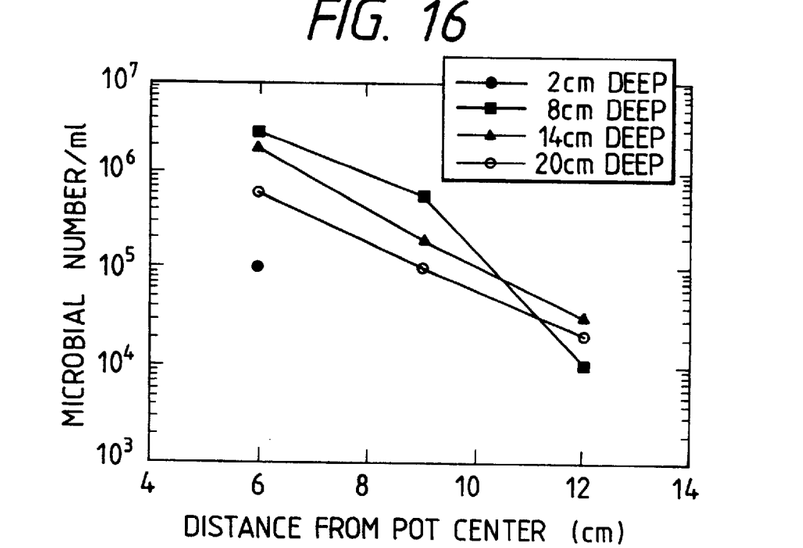
FIG. 16 is a graph showing the number of microorganism at the sampling points in Comparative Example 4.
Figure 17:
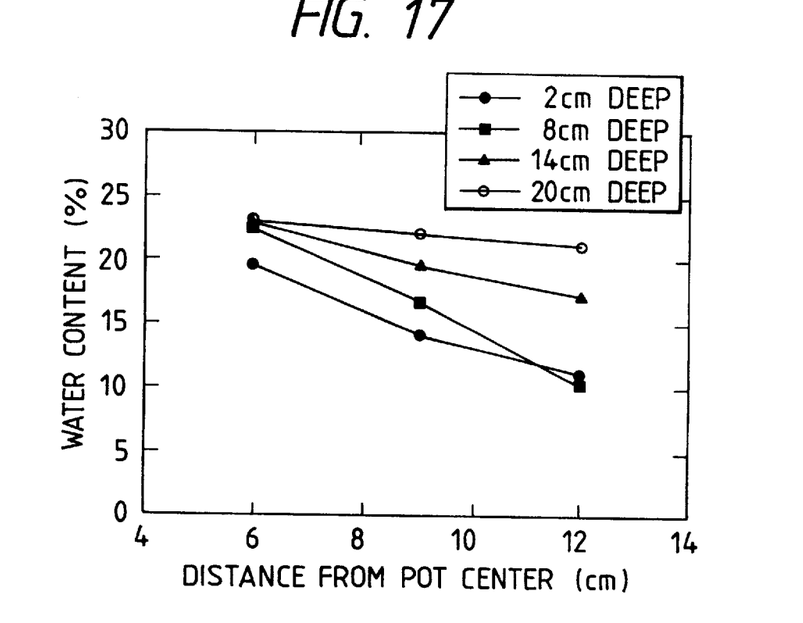
FIG. 17 is a graph showing the water content at the sampling points in Comparative Example 4.

Migration of Microbial Cells and Change of Water Content in Pot with Injection of Liquid Agent Alone A procedure similar to that of Example 3 was carried out except that injection of air was not carried out to observe the migration of microbial cells and water content in the pot. The number of the microorganism and the water content at each sampling point are shown in FIG. 16 and FIG. 17 respectively. These results show that the injection of the liquid agent alone only achieves uneven water content in the soil and does not allow the efficient migration of the microbial cells.

Example 5

Decomposition of Phenol in Column with Liquid Agent Injection Followed by Immediate Air Injection Columns packed with fine sand were prepared in the same manner as in Example 1. Phenol was added to the sand to a concentration of about 10 ppm for experiments. As a microorganism, strain JI was used. It was cultured overnight in an M9 medium supplemented with 0.1% yeast extract. The number of the microorganism of the overnight culture, determined by the number of colonies formed on an agar medium, was $5 \times 10^8$ cells/ml. The overnight culture was diluted 500 times with pure water, and the dilution of $1 \times 10^6$ cells/ml was injected into the column as a liquid agent from the bottom. The injection of the liquid agent was carried out using a peristaltic pump at the pumping speed for injection of 50 ml/min. The injection of the liquid agent was stopped when the liquid agent reached 45 cm from the bottom of the sand layer, and immediately followed by injection of the air under a pressure of 1 kg/cm$^2$. Air injection was continued until the water front in the sand was observed to reach the upper end of the sand layer. The water content of the soil immediately after the liquid injection measured in the same manner as in Example 1 was 22–23%.

The above-mentioned injection procedure was carried out in two columns; the fine sand layer was taken out from one of the columns immediately after the injection of the air, while the other column was sealed tightly with a Teflon seal immediately after the air injection, and after 5 days the fine sand was taken out from this column for phenol concentration determination. The sampling of the sand layer was carried out at 9 points, i.e. 5 cm from the bottom of the sand layer to 85 cm from the bottom with an interval of 10 cm, and the phenol concentration at each sampling point was measured according to JIS method (JISK 0102-1993, 28.1). The phenol concentration at each sampling point is shown in Table 1. These results show that the microorganism and water were migrated efficiently in the soil and phenol in the soil was decomposed efficiently by the process where the liquid injection was followed by air injection under pressure into the region of which water content is 0.6 or more times its saturation water content.

TABLE 1

Phenol concentration (ppm) in the column immediately after and 5 days after injection of air

| | Distance from the bottom of the sand layer (cm) | | | | | | | | |
|---|---|---|---|---|---|---|---|---|---|
| | 5 | 15 | 25 | 35 | 45 | 55 | 65 | 75 | 85 |
| Immediately after injection | 10 | 9 | 10 | 11 | 11 | 9 | 8 | 9 | 10 |
| 5 days after injection | 0 | 0 | 1 | 0 | 1 | 0 | 0 | 0 | 0 |

Comparative Example 5

Decomposition of Phenol in Column with Injection of Liquid Agent Alone

Into a column of fine sand polluted with phenol, the liquid agent was injected in the same manner as in Example 5.

After the injection of the liquid agent, the column was tightly sealed with a Teflon seal and the fine sand layer was taken out from the column after 5 days to determine the phenol concentration. The sampling of the sand layer was carried out at 9 points 5 cm from the bottom of the sand layer to 85 cm from the bottom at an interval of 10 cm, and the phenol concentration at each sampling point was measured according to JIS method (JISK0102-1993,28.1). The phenol concentration at each sampling point is shown in Table 2. These results show that the injection of the liquid agent alone does not allow the efficient migration of the microbial cells or the efficient decomposition of phenol in the soil.

TABLE 2

Phenol concentration (ppm) in the column into which only the liquid agent was injected

| | Distance from the bottom (cm) of the sand layer | | | | | | | | |
|---|---|---|---|---|---|---|---|---|---|
| | 5 | 15 | 25 | 35 | 45 | 55 | 65 | 75 | 85 |
| 5 days after injection | 0 | 0 | 0 | 1 | 3 | 4 | 7 | 9 | 7 |

Example 6

Decomposition of Trichloroethylene in Column with Liquid Agent Injection Followed by Immediate Air Injection Columns packed with fine sand were prepared in the same manner as in Example 1.

Trichloroethylene (TCE) was added to the sand layer of each column to the concentration of about 10 ppm for experiments.

As a microorganism, strain JM1 (National Institute of Bioscience and Human-Technology, Agency of Industrial Science and Technology: FERM BP-5352) was used. It was cultured overnight in an M9 medium supplemented with 0.1% yeast extract. The number of the microorganism of the overnight culture, determined by the number of colonies formed on an agar medium, was $5 \times 10^8$ cells/ml. The overnight culture was diluted 500 times with pure water, and the dilution of $1 \times 10^6$ cells/ml was injected into the column as a liquid agent from the bottom. The injection of the liquid agent was carried out using a peristaltic pump at the pumping speed for injection of 50 ml/min. The injection of the liquid agent was stopped when the liquid agent reached 45 cm from the bottom of the sand layer, and immediately followed by injection of the air under a pressure of 1 kg/cm$^2$. Air injection was continued until the water front in the sand was observed to reach the top of the sand layer. The water content of the soil immediately after the liquid injection determined as in Example 1 was about 22–23%. The above-mentioned injection procedure was carried out on two columns; the fine sand layer was taken out from one of the columns immediately after the injection of air, while the other column was tightly sealed with a Teflon seal immediately after the air injection, and the fine sand was taken out from this column 5 days later, for trichloroethylene concentration determination. Sampling of the sand layer was carried out at 9 points, i.e. 5 cm from the bottom of the sand layer to 85 cm from the bottom with an interval of 10 cm, and the TCE concentration at each sampling point was measured according to solvent extraction method using n-hexane. The TCE concentration at each sampling point is shown in Table 3.

These results show that the microbial cells and water can be migrated efficiently in the soil and the TCE in the soil can be decomposed efficiently when the liquid agent injection is followed by an air injection under pressure through the region of which water content is 0.6 or more times its saturation water content.

TABLE 3

TCE concentration (ppm) in the column immediately after and 5 days after the injection of air

| | Distance from the bottom of the sand layer (cm) | | | | | | | | |
|---|---|---|---|---|---|---|---|---|---|
| | 5 | 15 | 25 | 35 | 45 | 55 | 65 | 75 | 85 |
| Immediately after injection | 6 | 7 | 6 | 8 | 7 | 8 | 9 | 8 | 9 |
| 5 days after injection | 0 | 0 | 0 | 0 | 0 | 1 | 0 | 0 | 0 |

Comparative Example 6

Decomposition of TCE in Column with Liquid Agent Injection Alone

The decomposition of TCE in a column was observed in a way similar to that used in Example 6 except that air was not injected.

The TCE concentration at each sampling point is shown in Table 4. These results show that the injection of the liquid agent alone does not allow the efficient migration of the microbial cells nor efficient decomposition of TCE in the soil.

TABLE 4

TCE concentration (ppm) in the column with liquid agent injection alone

| | Distance from the bottom of the sand layer (cm) | | | | | | | | |
|---|---|---|---|---|---|---|---|---|---|
| | 5 | 15 | 25 | 35 | 45 | 55 | 65 | 75 | 85 |
| 5 days after injection | 0 | 0 | 0 | 0 | 1 | 2 | 6 | 8 | 7 |

Example 7

Decomposition of TCE in Pot with Injection of Liquid Agent Followed by Immediate Air Injection Pots packed with fine sand were prepared in the similar manner as that used in Example 3. For experiments, TCE was added to the fine sand to a concentration of about 10 ppm. As a microorganism, strain JM1 was used. It was cultured overnight in an M9 medium supplemented with 0.1% yeast extract. The number of the microorganism of the overnight culture, determined by the number of colonies formed on an agar medium, was $5 \times 10^8$ cells/ml. The overnight culture was diluted 500 times with pure water, and the dilution of $1 \times 10^6$ cells/ml was injected into the pot as a liquid agent from the bottom. The injection of the liquid agent was carried out using a peristaltic pump in the center of the pot, at the depth of 8 cm, and the pumping speed for injection was 200 ml/min. The liquid agent was injected for 5 minutes, then without delay, about 40 l air was injected under a pressure of 1 kg/cm² for 3 minutes through the same injection port. The water content of the soil immediately after the liquid injection determined as in Example 3 was about 22–23%.

The above-mentioned injection procedure was carried out in two pots; the fine sand layer was taken out from one of the pots immediately after the injection of air, while the other pot was tightly sealed with a TEFLON brand polytetrafluoroethylene seal immediately after the air injection, and the fine sand was taken out from the pot 5 days later, both for trichloroethylene concentration determination. Sampling of the sand layer was carried out total at 12 points, i.e. at radii of 6 cm, 9 cm and 12 cm from the center of the pot, each in the depth of 2 cm, 8 cm, 14 cm and 20 cm from the surface of the soil. The TCE concentration at each sampling point was measured according to solvent extraction method using n-hexane. The TCE concentration at each sampling point is shown in Table 5 and Table 6. These results show that the microorganisms and water can be migrated efficiently in the soil to efficiently decompose the TCE in the soil when air was injected under pressure through the region of which water content is 0.6 or more times its saturation water content after the injection of the liquid agent.

TABLE 5

TCE concentration (ppm) in the pot immediately after injection of air

| | | Distance from the center of the pot (cm) | | |
|---|---|---|---|---|
| | | 6 | 9 | 12 |
| Depth(cm) | 2 | 8 | 9 | 9 |
| | 8 | 6 | 7 | 8 |
| | 14 | 6 | 8 | 9 |
| | 20 | 7 | 8 | 9 |

TABLE 6

TCE concentration (ppm) in the pot 5 days after injection of air

| | | Distance from the center of the pot(cm) | | |
|---|---|---|---|---|
| | | 6 | 9 | 12 |
| Depth(cm) | 2 | 1 | 2 | 2 |
| | 8 | 0 | 0 | 0 |
| | 14 | 0 | 0 | 0 |
| | 20 | 0 | 2 | 9 |

Comparative Example 7

Decomposition of TCE in Pot with Injection of Liquid Agent Alone

The decomposition of TCE in a pot was observed 5 days after the injection of the liquid agent in the same manner as in Example 7 except that air was not injected.

The TCE concentration at each sampling point is shown in Table 7. These results show that the injection of the liquid agent alone does not allow the efficient migration of the microbial cells thus TCE in the soil cannot be efficiently decomposed.

TABLE 7

| TCE concentration (ppm) in the pot with liquid agent injection alone | | | | |
|---|---|---|---|---|
| | | Distance from the center of the pot(cm) | | |
| | | 6 | 9 | 12 |
| Depth(cm) | 2 | 2 | 8 | 9 |
| | 8 | 0 | 0 | 8 |
| | 14 | 0 | 1 | 2 |
| | 20 | 0 | 2 | 5 |

What is claimed is:

1. A process for remediating a soil contaminated with a pollutant by using a microorganism, comprising the steps of:

injecting a liquid containing a microorganism capable of degrading the pollutant into a predetermined site of the soil region to be remedied; and injecting gas into the predetermined site where the liquid agent is injected, wherein the gas injection step is conducted when a water content of the site is 0.6 or more times a saturation water content of the soil.

2. A process according to claim 1, wherein the pollutant is phenol.

3. A process according to claim 1, wherein the pollutant is a chlorinated organic aliphatic hydrocarbon.

4. A process according to claim 1, wherein the pollutant is trichloroethylene.

5. A process according to claim 1, wherein the microorganism is strain J1 (FERM BP-5102).

6. A process according to claim 1, wherein the microorganism is strain JM1 (FERM BP-5352).

7. A process according to claim 1, wherein the liquid contains dissolved gas.

8. A process according to claim 1, wherein the gas contains at least one gas selected from the group consisting of air, oxygen, nitrogen, carbon dioxide and methane.

9. A process according to claim 1, wherein the liquid further contains nutrient for said microorganism.

* * * * *

UNITED STATES PATENT AND TRADEMARK OFFICE
CERTIFICATE OF CORRECTION

PATENT NO. : 5,803,664
DATED : September 8, 1998
INVENTOR(S) : YUJI KAWABATA ET AL.

It is certified that error appears in the above-identified patent and that said Letters Patent is hereby corrected as shown below:

COLUMN 5

Line 21, "changes" should read --change--.

COLUMN 6

Line 33, "The" should read --the--;
    Line 46, "are" should read --is--.

COLUMN 10

Line 29, "were" should read --and they were--.

On the title page: Item [30]
    Line FAPD, "Oct. 25, 1899" should read --Oct. 25, 1996--.

Signed and Sealed this

Twenty-seventh Day of April, 1999

Attest:

Q. TODD DICKINSON

Attesting Officer    Acting Commissioner of Patents and Trademarks